United States Patent
McShan

[15] 3,675,055
[45] July 4, 1972

[54] MOTOR INCORPORATING TORSIONAL MODE RESONATOR

[72] Inventor: C. Hunter McShan, P.O. Box 392, Northport, N.Y. 11768

[22] Filed: March 15, 1971

[21] Appl. No.: 124,178

Related U.S. Application Data

[63] Continuation-in-part of Ser. No. 888,435, Dec. 29, 1969.

[52] U.S. Cl. .................. 310/22, 58/23, 58/116, 310/25, 310/37, 310/80, 318/129
[51] Int. Cl. ........................................... H02k 33/16
[58] Field of Search ..................... 310/36–39, 20, 310/25, 80, 82; 318/126–132, 254, 330; 58/23, 116

[56] References Cited

UNITED STATES PATENTS

| | | |
|---|---|---|
| 3,463,953 | 8/1969 | Maxwell ........................... 310/80 X |
| 3,515,914 | 6/1970 | Steinemann ....................... 310/37 |
| 2,750,730 | 6/1956 | Kohlhagen ......................... 58/116 M |
| 3,474,270 | 10/1969 | Dietsch ............................. 310/25 |
| 3,308,313 | 3/1967 | Farre ................................ 310/36 |
| 2,986,686 | 5/1961 | Clifford ............................. 318/254 |

FOREIGN PATENTS OR APPLICATIONS 482,232  1/1970  Switzerland ........................ 58/23 D Primary Examiner—R. F. Staubly
Assistant Examiner—B. A. Reynolds
Attorney—Brumbaugh, Graves, Donohue & Raymond

[57] ABSTRACT

A subminiature microwatt synchronous motor includes a rotor driven magnetically or mechanically by a balanced torsional mode resonator which is attitude-insensitive and temperature-compensated. The shock resistance of the resonator is improved by strengthening the torsional arm in the direction parallel to the plane of the rotor, and by reducing the moment of inertia of the masses in the cantilever mode to raise the ratio of cantilever/torsional frequencies.

33 Claims, 11 Drawing Figures

PATENTED JUL 4 1972 3,675,055
SHEET 1 OF 3
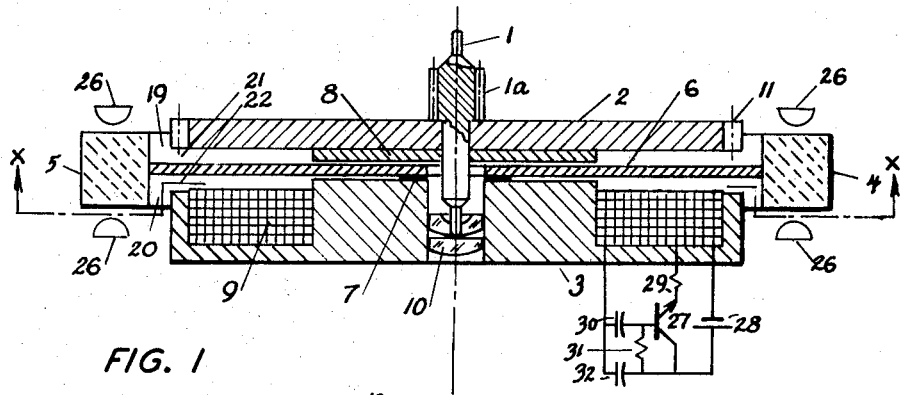
FIG. 1
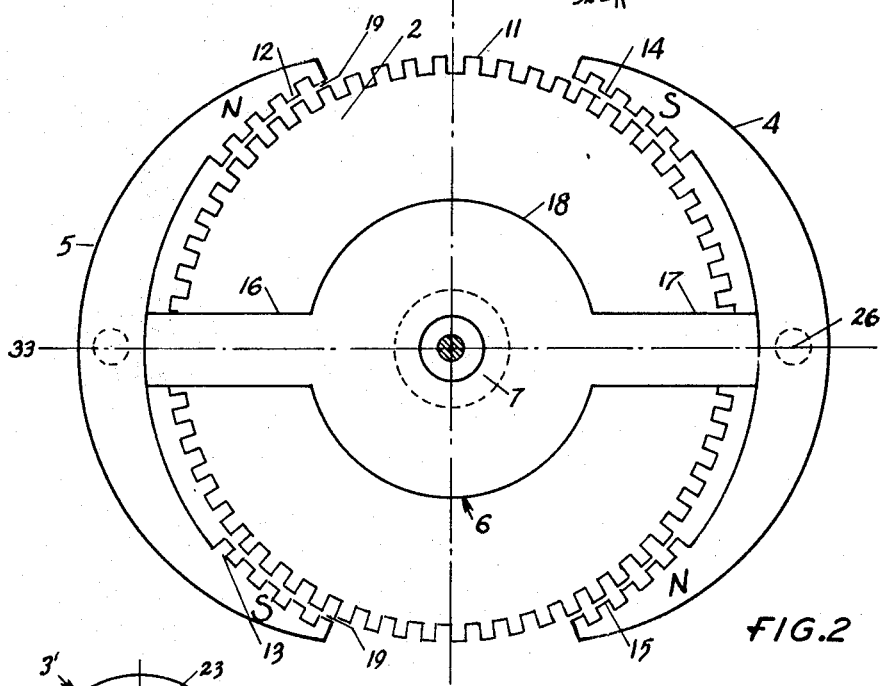
FIG. 2
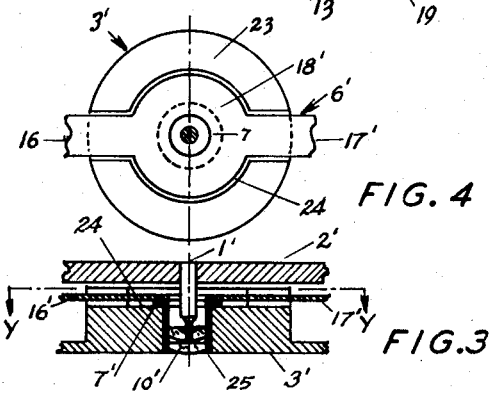
FIG. 4
FIG. 3
C. HUNTER McSHAN
INVENTOR.

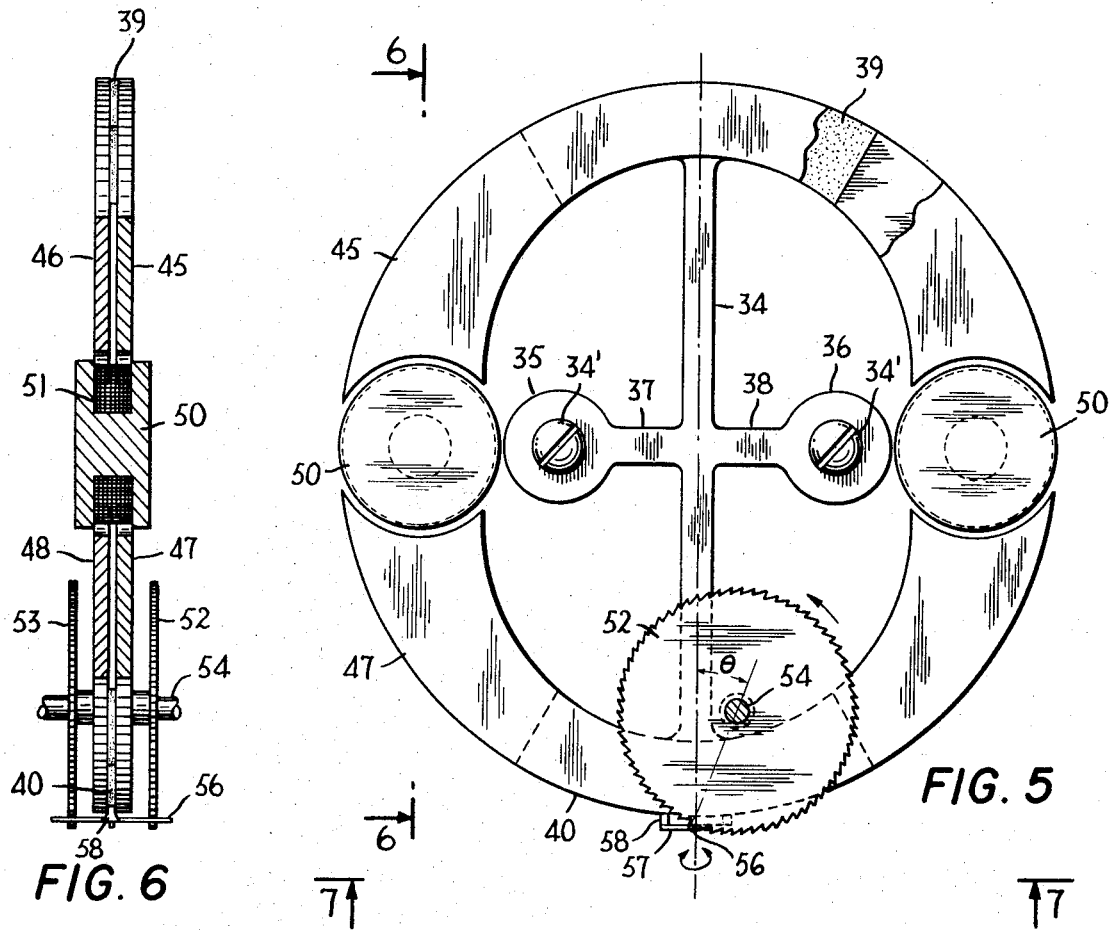
FIG. 5
FIG. 6
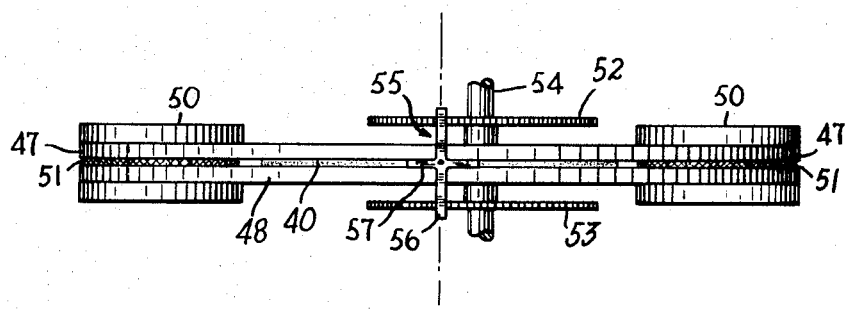
FIG. 7
FIG. 8
INVENTOR.
C. HUNTER McSHAN
BY
Brumbaugh, Graves, Donohue + Raymond
his ATTORNEYS

MOTOR INCORPORATING TORSIONAL MODE RESONATOR

RELATED APPLICATION

This application is a continuation-in-part application of abandoned application, Ser. No. 888,435, entitled "Motor Incorporating Torsional Mode Resonator" filed Dec. 29, 1969 by C. Hunter McShan.

BACKGROUND OF THE INVENTION

The invention relates generally to synchronous motors which incorporate highly accurate vibrating frequency standards, and more particularly to microwatt synchronous motors used to drive clocks and watches.

Small electric motors have been designed for clocks and watches incorporating frequency standards of various types to control the motor speed. The frequency standards are small mechanical articles, such as tuning forks, which are electromagnetically driven to sustain vibration at their natural frequency. The vibration is converted to rotary motion through suitable indexing means, such as mechanical and magnetic ratchets. Such motors have been generally accepted in the art because of their inherently superior accuracy over prior art escapement wheel timers, but there remain serious limitations to their use which must be eliminated before these motors can be employed to their full potential. Existing motors which incorporate these vibrating frequency standards are expensive and delicate, and their accuracy is sensitive to shock and attitude. The object of this invention, therefore, is to develop a design in which the frequency standard is integrated in a rugged, shock resistant, and durable motor in such a way that accuracy is unaffected by shock and attitude and the total number and complexity of the component parts are greatly reduced.

SUMMARY OF THE INVENTION

A preferred embodiment of the invention includes a torsional mode resonator carrying rotor-indexing magnets at the ends of the torsional member, with the magnets and the torsional member being contained in a common plane and with the magnets interacting at their ends with the rotor so that vibration of the frequency reference indexes the rotor in synchronism. A single coil and core configuration is integrated with the rotor and resonator to define magnetic coupling paths which excite torsional resonance in the frequency reference through constant reluctance gaps.

Another preferred embodiment of the invention includes a similar torsional resonator having magnetic arms disposed adjacent a soft core wound with an inductor. The out-of-phase oscillation of the opposite magnet ends reverses the magnetic flux in the coil, producing an AC signal in the inductor which controls a drive amplifier providing in-phase electromagnetic drive to sustain oscillation of the resonator, in a manner similar to that of the first embodiment. A ratchet pawl is connected to the ends of the resonator arm and extends vertically above and below the arm to engage a pair of vertically spaced index wheels keyed to a shaft which drives the load. The magnetic structure of each device can be used either as a frequency reference or, when linked to an output shaft, as a microwatt motor.

BRIEF DESCRIPTION OF THE DRAWING

FIG. 1 is a cross-sectional elevation of a preferred embodiment of one species of a motor constructed in accordance with the present invention and includes a circuit diagram showing a preferred circuit for the electromechanical oscillator embodied therein;

FIG. 2 is an elevation, partly in section, along section line X—X in FIG. 1;

FIGS. 3 and 4 are sectional views corresponding to FIGS. 1 and 2 respectively and showing a modification of certain parts of the motor;

FIG. 5 is a plan view of a preferred embodiment of a second species of a motor constructed in accordance with the present invention;

FIG. 6 is an elevation partly in section, along line Y—Y in FIG. 5;

FIG. 7 is an elevation along line Z—Z in FIG. 5;

FIG. 8 is a plan of a portion of the index wheel and ratchet pawl shown in FIG. 7;

DESCRIPTION OF THE PREFERRED EMBODIMENT

Figure 9:
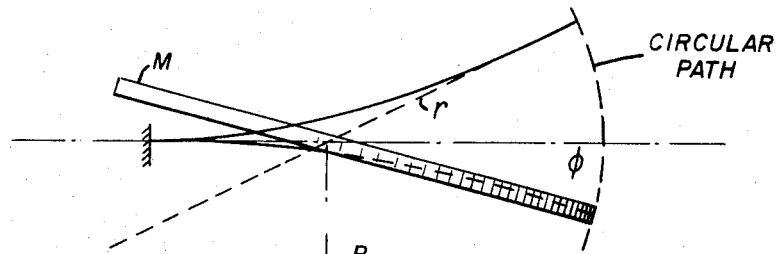
FIGS. 9, 10 and 11 are diagrammatic sketches illustrating the effect of the resonator's mass distribution on its cantilever mode response to shock normal to the rest plane of the resonator.

With reference to FIGS. 1 and 2, the first species of the invention is embodied in a motor including a rotor 2 carrying radial teeth 11 and mounted on a shaft 1 formed with an integral pinion 1–a, all supported by an end thrust bearing 10 and a top bearing (not shown). A torsional resonator comprised of a torsional spring member 6 having a hub 18 is supported by a washer 7 which is in turn supported by a stator cup core 3. The resonator has arms 16 and 17 spaced 180° apart with their respective ends carrying identical, curved magnets 4 and 5 polarized N-S-N-S circumferentially about the rotor. The magnets function as balanced masses in combination with the torsional spring member to form the resonator. The magnets carry teeth 12, 13, 14 and 15 corresponding to the pitch of the rotor teeth, with the teeth at the north poles displaced one-half pitch relative to the teeth located at the south poles of the same magnet. The tooth positions of the opposite magnets are the same at their respective north and south poles. A balanced torsional mode of vibration is utilized wherein the arms 16 and 17 twist in opposite directions about longitudinal axis 33, such that the north poles move in opposite directions from the south poles, with the longitudinal axis remaining fixed.

Vibrational displacement at the ends of the magnets should ideally be one-half the rotor thickness (or about 3° of twist in the configuration shown) and is for all practical purposes parallel to the rotor axis. When for example, the north poles are in the "up" position, they are in registry with and magnetically engage the rotor while the south poles are in registry with and magnetically engage the stator. Then the flux from the permanent magnets 4 and 5 will flow from the north poles through the rotor 11, through a washer 8, through the hub 18 of the torsional resonator, through the coaxial central portion of the stator cup core 3 which is enclosed by a motor winding 9 seated in the core and which will be cut by the flux. Lastly, the flux returns to the south poles through the gap at the outside surface of the cup core. When the positions of the north and south poles are reversed due to reverse twisting of the arms 16 and 17, flux will flow in the opposite direction through the winding. When the resonator is in the rest position, no flux flows through the winding. Each reversal of the magnetic poles or half-cycle of vibration of the resonator causes the rotor to advance one-half a tooth pitch.

The rotor, washer 8 and the stator are preferably made of soft magnetic material, such as Mumetal. The torsional member is made of a constant modulus alloy like Ni-Span-C which is a soft magnetic material having an initial permeability of 4 and a maximum permeability of 50 at 2,000 gauss. The magnets may be made of a machinable alloy like vicalloy, $B_r$ is 9,400 gauss and $H_c$ is 400 orsteds. Relatively speaking, very little flux passes through the torsional arms 16 and 17 of the resonator because the gaps above and below the hub are made small and equal and the hub surface area is large. A supporting and spacing washer 7 between the resonator and the core is made non-magnetic. Under these conditions, the magnetic potential from the hub through the arms to the center of the magnets 4 and 5 is zero, hence no flux can flow through this path, and the system is the equivalent of a balanced magnetic bridge. In addition, this path is of low permeability and low cross-sectional area.

The torsional resonator is suited to low frequency operation which keeps the magnetic losses low and the speed of rotation of the rotor low. The symmetrical resonator is attitude-insensitive and lends itself to automatic balancing and timing at the factory so that a regulator adjustment would not be necessary in the case, say, of a watch motor which might be subjected to various attitudes due to habits of the wearer. The hub area is made large compared to the area of mounting so that mechanical cross-coupling around the hub will make the balanced position of mounting less critical. Also, the large area of the hub reduces the reluctance of the magnetic circuit through the winding. The wide arms of the resonator give rigidity to the resonator to shock and vibration in the plane of the arms. Since the arms are thin, bumpers 26 are used to limit the travel due to shock and vibration in the direction of the rotor axis, to prevent hitting the rotor or the cup core stator. These bumpers 26 are located on the zero motion axis of the arms, hence the bumpers will not stop torsional vibration. Gaps 21 and 22 between the rotor 2 and the stator 3 are made large at the outer edge so most of the flux will go through the winding, and considerable deflection of the arms can occur before striking the bumpers.

The magnetic circuit can be essentially a constant reluctance design, as shown in FIG. 1, where total gaps (19 plus 20) between the resonator magnets and rotor 2 and stator 3 sum to a constant, and where the areas of the upper and lower gaps 19 and 20 respectively are modulated proportionately by the up and down motion of the magnets, one increasing as the other decreases. This linear modulation of flux has little adverse effect upon the resonator's natural frequency. This type of gap configuration also avoids overtravel problems which can occur in designs where spacing is modulated. The magnets with a thick center and tapering arms enable ample flux for a reasonable number of turns on the winding. Maximum vibrational displacement for linear modulation of the gap area would, therefore, be one-half the thickness of the rotor.

The linearity of the system may be compromised in favor of a stronger motor magnetic indexing or synchronization by lowering the top edges of the magnets to the lower edge of the rotor. The maximum deviation will be the thickness of the rotor. Thus, a stronger differential magnetic force on the teeth will be developed.

In operation, since the teeth on the north and south poles are displaced one-half a tooth pitch, when the resonator is at rest, no net torque can be developed and the rotor will turn freely, that is, the teeth will have no tendency to align with the teeth of the magnet. If the drive signal is applied, say, only during the period when the north pole teeth start to engage the rotor teeth and ends when full engagement occurs, then the motor will be self-starting in either direction. If the rotor teeth are aligned, say, half-way under the north poles and on the counter-clockwise side of the north teeth by a magnetic or other detent, then self-starting will occur in a clockwise direction.

The motor may be driven by the electromechanical system in my U.S. Pats. Nos. 2,942,205 and 2,950,447, and one such circuit is illustrated in FIG. 1. This system may be class A, B or C operation. In class A, the resonator is self-starting. In the arrangement of FIG. 1, the circuit starts in class A and operates in class B or C for more efficient pulse operation. The circuit is similar in operation to the oscillator portion of FIG. 10 of my said patents, where resistor 31 biases the amplifier transistor 27 to class A and capacitor 30 will develop a back-bias due to the base-emitter diode action as oscillation amplitude increases, thus biasing the amplifier to class B or C.

An alternative design is shown in FIGS. 3 and 4, in which corresponding parts are identified by corresponding but primed reference numerals. The resonator includes a hub 18' which is about half the diameter of the inner or central portion 23 of the cup core 3'. The hub and the inner ends of the arms 16' and 17' are received in a recess 24 in the cup cores with clearances around the edges. The upper surface of the cup core may then act directly as a pole face with the rotor. (The washer 8 of FIG. 1 is therefore eliminated.) Thus, most of the flux may be made to pass around the hub 18' of the resonator rather than through it. This arrangement has the advantage of only one gap, one less part, and less losses in the constant modulus material of the arm. The washer 7' may be integral with a sleeve 25 containing the end thrust bearing 10'. This simplifies alignment and enables the resonator to be balanced and tuned as a subassembly.

In the illustrated circuit, the power source is indicated by the numeral 28. The emitter resistance 29 is optional. The capacitor 32 in combination with the inductance 9 (the motor winding) and its resistance, prevents the circuit alone from oscillating at any frequency, even in class A. This combination forms a low-pass filter whose cutoff frequency is always greater than the mechanical resonance frequency. The winding 9 may be one or more closely coupled coils. In the case of two coils, the winding is tapped as shown and connected to the emitter through resistor 29.

The electromechanical system described in my U.S. Pat. Nos. 2,942,205 and 2,950,447, and as applied to the present invention, is based on a bidirectional transducer using one magnetic circuit coupled by one inductor. One magnetic circuit defines the transducer as a two-terminal device, which may be tapped to obtain a change of impedance and/or a phase reversal between input and output. In this system, the transducer inductor L and it series resistance R (not shown) is shunted by a capacitor C, to form a low-pass filter whose cutoff frequency $f_c$ is made substantially greater than mechanical resonator frequency $f_m$. It can be shown that for optimum efficiency, the ratio of $f_c/f_m = \sqrt{kQ_m}$, where $Q_m$ is the resonator Q and k is the coupling coefficient between the resonator and the inductor L. Design $R = (2\Delta f_c L)/Q$, where $Q_c = 0.5$ for critical damping, or $Q_c = 0.707$ for the preferred uniform low-pass filter impedance (equal to R). Thus, a composite filter comprised of a series-damped electrical low-pass filter in parallel with a mechanical band pass filter can be devised as a two-terminal network. When this network is placed in a positive feedback circuit of a class A amplifier and the loop gain set to unity for $f_m$, the system will only oscillate at $f_m$. The tendency of the circuit alone to oscillate at any frequency in the low-pass region will be suppressed by: $1/(Q_c \sqrt{kQ_m})$. This system requires the resonator to operate slightly below $f_m$. At this frequency, the resonator produces inductive reactance which resonates with the reactance of C. By this means, the composite network automatically adjusts for a stable zero phase shift positive feedback to form a valid electromechanical oscillator. Thus, the transducer inductor is made integral with the network requirements, which results in a physical simplicity and compactness so desirable in horological applications.

When $f_c = f_m$, mechanical feedback will be less than the electrical feedback, because the transducer efficiency is always less than 100 percent. Thus, the circuit alone must necessarily oscillate and must be synchronized by the resonator if it is to operate precisely at $f_m$. This is the well-known synchronized electrical oscillator, not to be confused with the above electromechanical oscillator. The synchronized oscillator has drawbacks of a much larger capacitor C, the circuit must be accurately tuned, and loss of synchronization is a hazard.

In a clock or watch, the rotor may be started by a lever arm operated by the hand-setting stem which carries a leaf spring engaging the rotor. After setting the correct time, the stem is snapped in, causing the leaf spring to spin the rotor in the proper direction. Such start-stop devices are well-known in the art.

The motor may be driven by an external power source having a frequency equal or harmonically related to the resonator frequency, whereby the motor functions as a synchronous motor.

The design lends itself to small sizes, for example, a rotor diameter of 0.4 inch and a total motor thickness of 0.1 inch, a resonator frequency of 60 hertz, 40 teeth on the rotor and a speed of 1½ rps. Obviously, the basic principles of this motor would allow the rotor to be made stationary and the resonator to rotate. Also, the device may be used only as a frequency standard, where the rotor, resonator and stator are all stationary, with teeth and bearings eliminated. In such case, an electrical output is taken from the circuit.

A second species of the invention, illustrated in FIGS. 5–8, uses a modification of the inventive torsional resonator to drive an output shaft through a mechanical ratchet mechanism instead of the magnetic ratchet of the species illustrated in FIGS. 1–4.

Looking first at FIG. 5, the torsional resonator includes a torsional arm 34 centrally suspended between the two spaced supports 35 and 36 located equidistant from torsional arm 34 on a line bisecting arm 34 and perpendicular to the axis thereto. Arm 34 is connected, as by screws 34' or the like, to supports 35 and 36 by means of short connecting sections 37 and 38, respectively. This arrangement provides elastic support of the resonator and allows continuous torsional coupling with no discontinuities through the length of arm 34. This arrangement also eliminates the rivet hole and the rivet through the center of the torsional arm which critically affects the frequency of oscillation of the torsional arm.

A pair of short arcuate sections 39 and 40 are integrally formed on the respective ends of torsional arm 34. Arcuate sections 39 and 40 provide a large area platform for mounting magnets 45–48 on the opposite ends of torsional arm 34.

The magnets 45, 46, 47 and 48 are generally semiannular in shape and are mounted in parallel pairs on the ends of torsional arm 34 on opposite faces of arcuate sections 39 and 40. The torsional arm 34 and magnets 45–48 are formed of relatively thin sheet material and are designed to require no precisely machined surfaces. The parts are thus ideally suited to low-cost high-production stamping techniques while maintaining a high degree of uniformity in frequency characteristics.

All four magnets, 45, 46, 47 and 48, are identically formed in the shape of a semi-annulus having enlarged ends formed in a concave arc. The radius of curvature of the arc is slightly greater than the radius of a magnetic bobbin 50, one of which lies between each pair of opposed ends of the magnets secured to opposite ends of torsional arm 34 and both of which lie on the line on which lies supports 35 and 36.

Looking at FIG. 6, the magnetic bobbin 50 is a flat cylinder formed of soft magnetic material. A deep annular groove is formed centrally in the periphery of bobbin 50 and receives the windings of a coil 51.

The operation of the torsional resonator of the second species, as described thus far, is as follows. The magnets on the ends of torsional arm 34 rotate or rock about the axis of torsional arm 34 in opposite directions or 180° out of phase while torsional arm 34 twists in torsion. Since the opposed ends of the magnets on the opposite ends of torsional arm 34 move in opposite directions, the flux passing through the bobbin and its inductor will reverse each half-cycle to produce an AC signal in the inductor. The signal controls a drive amplifier in the conventional manner to provide current to the inductor winding and generate a magnetic force which is in phase with the movement of the magnet ends to thereby sustain torsional oscillation of the resonator. The magnetic bobbins may be arranged in a two transducer design, where one transducer drives the resonator and the other provides the control signal; or if desired, the inductors may be serially combined and a portion of one inductor tapped to operate with the drive system shown in FIG. 1.

FIGS. 5–8 show the ratchet mechanism. Index wheels 52 and 53 are keyed to a shaft 54 disposed perpendicular to the plane of the resonator at rest. An index pawl 55, comprised of a vertical blade 56 intersecting a horizontal arm 57, is connected at the ends of arm 57 to a pair of short tabs 58 projecting from the outside periphery of arcuate section 40 such that the axis of arm 34 passes through the intersection of blade 56 and arm 57. As the resonator resonates, blade 56 will rock back and forth about the axis of arm 34 and, engaging the top and bottom index wheels 52 and 53 will index the wheel the radial extent of one tooth for each half oscillation. FIG. 8 shows the motion of the pawl blades must be parallel with the face of the tooth. Thus, for a tooth cut at angle $\theta$ the axis of shaft 54 must be so positioned that an angle $\theta$ occurs as shown in FIG. 5. The pawls are relatively wide in comparison with their thickness, thus they are quite rigid in their driving direction while being quite flexible in a direction normal to the teeth.

Should the resonator be subject to shock in a direction normal to its plane, pawl blade 56 will slide across the index teeth without damage. If the resonator is subject to shock in a direction normal to the torsional arm's axis and in the plane of the resonator, the relatively wide torsional arm 34 makes the resonator quite rigid in this direction. Any motion of the pawl in this direction will momentarily advance the index wheel's rotation. Thus the arrangement is ideally suited to shock-resistant operation and does not require a force limiting pawl design as was necessary in the prior art.

Inaccuracy in prior art vibrating frequency standard motors is caused, in part, by sensitivity to shock. When shock is delivered in the direction normal to the rest plane of the resonator, the resonator will commence to vibrate in the cantilever mode. The ends of the resonator arm will strike other structure in the motor, thereby disrupting the natural rhythm of the resonator. In addition, the translation of the magnetic or mechanical drive structure may be so far beyond the bounds of its normal operation that disruption to the drive forces and damage to the drive structure may result.

The improved ability of the resonator of this invention to resist these effects and maintain accuracy despite shock in the direction normal to the rest plane of the resonator is believed to result from the arcuate configuration of the magnets which curve back toward the axis of cantilever vibration. This configuration, incidently, also provides symmetrical compactness and mechanical simplicity. The shock resistance is believed to be attributable, in part, to the following effect.

With reference first to FIG. 9, when a vertical impulse force is delivered to the device, such as occurs when it is dropped, causing it to accelerate in the upward direction or decelerate in the downward direction, the inertia of magnets will cause the torsional arms to flex downwardly thereby commencing vibration in the cantilever mode. The ends of the arms translate in a downwardly curving circular arc with radius $r$, as do the midportions of the magnets to which the ends of the arms are respectively rigidly attached. At maximum deflection, the arms describe a downwardly curving arc whose tangent at the ends of the arms, and the plane of the magnet rigidly attached thereto, extends from the ends of arms upwardly and inwardly toward the vertical axis of the motor.

Considering now the entire family of planes occupied by one of the magnets during oscillation of the resonator in the cantilever mode, there will be a line P which lies in and parallel to or near all of these planes, which line represents a node or axis about which the magnet oscillates in the cantilever mode. The moment of inertia I of mass M taken about this line P and the spring rigidity of the arm determine the cantilever frequency. If all the mass were located at the end of the arm, it is obvious the moment of inertia $I = Mr^2$ would be appreciably greater than the distributed mass about the line P. With the cantilever frequency substantially raised, the deflection angle $\phi$ will decrease proportionally for a given shock excitation.

Figure 10:
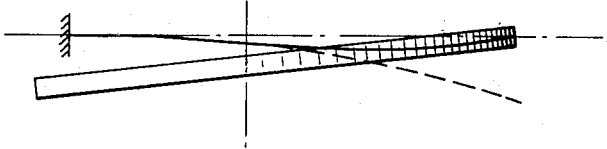

It is possible to design the resonator so that, at the instant of shock, the end of the arm will not deflect at all, as shown in FIG. 10. The rigid mass attached to the end of the arm causes a reverse bend in the arm. After the instant of shock, the mass will then begin to vibrate as shown in FIG. 9.

Figure 11:
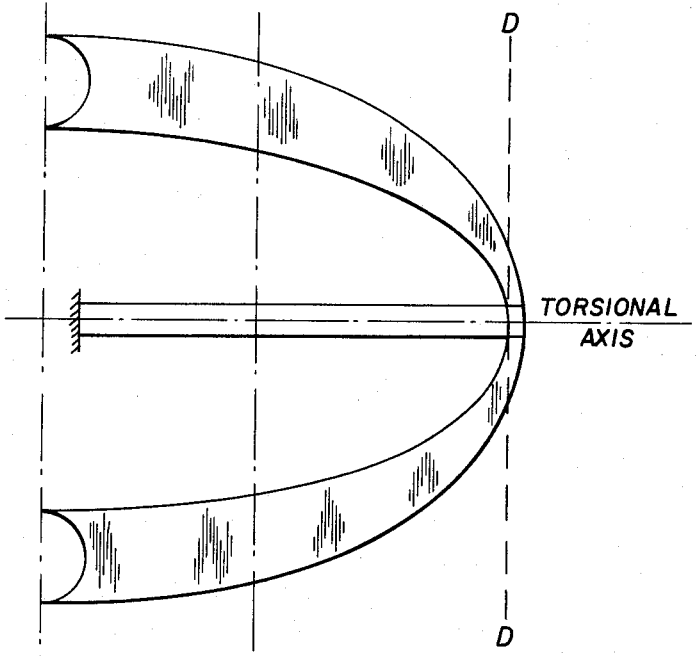

As shown in FIG. 11, the magnet may have various shapes. It is clear that the moment of inertia of the mass about P is less than moment taken about the axis C—C located at the ends of the mass, or an axis D—D passing through the mass at the end of the arm. Thus it is clear that a minimum moment may be found for the magnet between the CC and DD axes. To have this minimum occur along the P axis enables the highest possible cantilever frequency for a given mass.

The relatively great mass at the ends of the magnets produces a moment of inertia about the axis of the torsional arm which is relatively great and a moment of inertia about the cantilever axis which is relatively small. The design thus produces a frequency of vibration in the torsional mode approximately four times lower than the frequency of vibration in the cantilever mode. This high frequency of vibration in the cantilever mode produces excellent shock resistance to a motor of this design, and the low frequency of oscillation in the torsional mode reduces the requirements for very fine index teeth and critical adjustments, necessary to obtain a low speed motor.

Obviously, numerous variations and modifications of the above-described preferred embodiment of the invention, defined in the appended claims, are possible in view of the teaching contained herein and the prior art. It is to be expressly understood, therefore, that this invention may be practiced otherwise than described herein while remaining within the scope of the appended claims.

I claim:
1. An electromagnetic device, comprising:
   1. a torsional resonator including
      a. an elongated elastic member,
      b. a lateral arm formed at at least one end of the elastic member and having mass that is balanced with respect to said elastic member,
         i. said arm providing a magnetic path and having oppositely biased magnetic pole pieces disposed symmetrically about said elastic member, and
      c. means supporting the elastic member at a torsional node; and
   2. magnetic path forming means having spaced pole pieces adapted to be magnetically coupled, respectively, in alternating fashion with the opposed magnetic pole pieces on said arm during torsional vibration of said resonator; and
   3. inductor means coupled with said magnetic path forming means and responsive to magnetic flux change therein.

2. An electromagnetic device as in claim 1 in which lateral arms are formed at each end of the elastic member and have masses that are balanced with respect to the elastic member, each of the arms provides a magnetic path and has oppositely biased magnetic pole pieces disposed symmetrically about the elastic member, magnetic pole pieces on the same side of the elastic member also being of opposite polarity, the elastic member is supported at a torsional node intermediate its ends, the spaced pole pieces of the magnetic path forming means are adapted to be magnetically coupled, respectively, in alternating fashion with the opposed magnetic pole pieces on each of said arms during torsional vibration of said resonator.

3. An electromechanical device according to claim 2, in which the magnetic pole pieces on said arms are spaced apart from the pole pieces of said magnetic path forming means in the direction of elongation of said elastic member.

4. An electromechanical device according to claim 3, in which the portion of the elastic member in the vicinity of the torsional node is greater in lateral extent than the end portions thereof.

5. An electromechanical device as in claim 4, in which the elastic member portion which is of greater lateral extent than the end portions is generally circular in shape and is in said magnetic path.

6. An electromechanical device according to claim 2, in which the elastic member and at least one of the spaced pole pieces of the magnetic path forming means are disposed for relative rotational motion, and the magnetic pole pieces on the opposite ends of each arm are disposed to maintain different degrees of magnetic coupling with the respective pole pieces of the magnetic path forming means during oscillation of said torsional resonator so as to generate a torque tending to produce said relative rotational motion.

7. An electromechanical device as in claim 6, in which one of the pole pieces of the magnetic path forming means comprises a generally disc-shaped member and the other pole piece of the magnetic path forming means comprises a cup core stator in said path and having a recess to accommodate the inductor means.

8. An electromechanical device as in claim 7, in which the disc-shaped magnetic member is mounted for rotation and is formed with peripheral teeth of uniform pitch, the inductor means is disposed in an annular recess in the cup core stator, and the pole pieces on the arms are in the form of teeth of the same pitch as the teeth on the disc-shaped magnetic member, the teeth at one end of each arm having a fractional pitch displacement with respect to the teeth at the other end of the arm so that oscillation of the torsional resonator indexes the disc-shaped magnetic member in rotary motion.

9. An electromechanical device according to claim 8, in which the number of teeth is divisible by four and the pole piece teeth at one end of each arm are displaced from the teeth at the other end by one-half pitch, whereby oscillation of the arms about the torsional axis produces a differential magnetic force on the rotor tending to rotate the same.

10. An electromagnetic device as in claim 8, in which the rotor has a thrust bearing carried by a sleeve in the cup core, and the elastic member is also carried by the sleeve.

11. An electromechanical device according to claim 7, in which the elastic member has a hub portion in the vicinity of its torsional node, and the cup core stator has a central core which is recessed to receive said elastic member hub portion, whereby the opposing faces of said core and the disc-shaped magnetic member define a magnetic flux coupling gap in said magnetic path.

12. An electromechanical device according to claim 2, in which the magnetic couplings between the magnetic pole pieces on said arms and the pole pieces of said magnetic path forming means adjacent thereto, respectively, vary in generally complementary fashion during oscillation of the torsional resonator so that the magnetic reluctance of said magnetic path forming means is substantially constant.

13. An electromechanical device according to claim 2, in which bumpers are disposed on opposite sides of said elastic member at positions along the torsional axis thereof to limit elastic member displacement due to external shock or vibration.

14. An electromechanical device according to claim 2, in which the opposite ends of each arm extend towards the opposite ends of the other arm, respectively, and away from the ends of the elastic member, so as to reduce the sensitivity of the device to shock normal to the plane of the elastic member.

15. An electromagnetic device as in claim 2, together with circuit means for sustaining the resonator in vibration.

16. An electromagnetic device as in claim 15, in which the vibration sustaining means is responsive to and controlled by the counter mmf coupling said inductor means and said magnets during vibration of the magnets about the torsional axis, whereby the resonator governs the vibration sustaining means.

17. An electromagnetic device as in claim 2, in which the inductor is connected to an external source of electrical energy the frequency of which is the same as or harmonically related to the resonator frequency, whereby the device operates as a synchronous motor.

18. An electromagnetic device, comprising:
   1. a torsional resonator including
      a. an elongated elastic member,
      b. a pair of spaced, laterally extending arms connected to said elastic member and having mass that is balanced with respect to said elastic member, said arms providing a magnetic path and having oppositely biased magnetic pole pieces disposed symmetrically about said elastic member, and
      c. means supporting the elastic member at a torsional node; and 2. magnetic path forming means having spaced pole pieces positioned to be magnetically coupled, respectively, in alternating fashion with magnetic pole pieces of opposite polarity during torsional vibration of said resonator to effect a periodic reversal of magnetic flux through said pole pieces; and 3. inductor means coupled with said magnetic path forming means and responsive to said magnetic flux change therein.

19. An electromechanical device according to claim 18, wherein:
each of said lateral arms has portions extending generally toward the respective opposite end of said elastic member from that end thereof to which said respective lateral arm is connected.

20. A torsional resonator as in claim 19, in which the elongated elastic member is thin in one direction normal to the direction of elongation of said member as compared with its extent in another direction normal to both said one direction and the direction of elongation of said member, whereby said resonator has reduced sensitivity to shock in both said one direction and said another direction.

21. An electromechanical device according to claim 18, wherein:
the axis of the minimum moment of inertia of each of said lateral arms respectively intersects said elastic member at a location intermediate the cantilever node of said elastic member and the junction between said elastic member and the respective lateral arm.

22. An electromechanical device according to claim 18, wherein:
the mass per unit length of said lateral arm is greater at the lateral ends thereof than it is at the intermediate portion thereof.

23. An electromechanical device according to claim 18, wherein:
said elastic member is suspended intermediate the ends thereof by a pair of integrally formed, oppositely extending connecting sections, thereby providing continuous torsional coupling along said elastic member.
said connecting sections extend laterally from the midpoint of said elastic member and are each connected at the end thereof to a base.

25. An electromechanical device according to claim 18, wherein:
the opposite ends of said elastic member are enlarged to provide a platform to which said lateral arms may be attached; and each of said lateral arms comprises a pair of arms formed of sheet magnetic material, one of each being connected to said enlarged end of said elastic member on opposite faces thereof.

26. An electromechanical device according to claim 25, wherein:
said lateral arms are generally arcuate in outline, forming with each other a symmetrical, rounded outline for said resonator.

27. An electromechanical device according to claim 18, wherein:
said spaced pole pieces are comprised of two enlarged ends of a bobbin formed of magnetic material disposed between the ends of said laterally extending arms on one side of said elastic member,
said inductor means is disposed in a coil coaxial with said bobbin and bracketed by the enlarged ends thereof.

28. An electromechanical device according to claim 18, wherein:
a ratchet pawl is connected to one end of said elastic member; an index wheel is disposed in contact with one end of said ratchet pawl; and said index wheel is keyed to an output shaft by which a load is driven.

29. An electromechanical device according to claim 18, wherein:
the axis of the minimum moment of inertia of each of said lateral arms intersects said elastic member intermediate the points of attachment of said lateral arms to said elastic member.

30. A torsional resonator as in claim 18, in which the lateral arm portions extend towards opposite ends of the elastic arm, respectively, so as to reduce the moment of inertia of the resonator and to produce a frequency of vibration in the cantilever mode that is substantially higher than the frequency of vibration in the torsional mode.

31. A torsional resonator comprising
1. an elongated elastic member
2. lateral arms formed at each end of the elastic member and symmetrically disposed about the axis thereof, said lateral arms having portions extending generally towards the opposite end of said elastic member,
   a. the arms at each end having masses that are balanced with respect to said elastic member,
   b. masses each having a center of gravity located inwardly of the ends of the elastic member, and
3. means mounting said elastic member at a torsional node intermediate its ends, whereby said resonator has reduced sensitivity to shock in a direction normal to a plane generally common to said elastic member and lateral arms.

32. A torsional resonator as defined in claim 31, wherein said mounting means is formed integrally with said elastic member and elastically supports said elastic member.

33. A torsional resonator as defined in claim 31, wherein said elastic member and said mounting means are stamped as one piece from sheet metal.

* * * * *

UNITED STATES PATENT OFFICE
CERTIFICATE OF CORRECTION

Patent No. 3,675,055      Dated July 4, 1972

Inventor(s)   C. Hunter McShan

It is certified that error appears in the above-identified patent and that said Letters Patent are hereby corrected as shown below:

Column 4, line 33, "$(2\Delta f_c L)/Q$" should be --$(2\pi f_c L)/Q$--.
Column 5, line 13, delete "the" after "between".
Column 9, between lines 40 and 41, insert --24. An electromechanical device according to claim 23, wherein:--.
Column 10, line 39, insert --the arm-- before "masses each having ...".

Signed and sealed this 10th day of April 1973.

(SEAL)
Attest:

EDWARD M. FLETCHER, JR.      ROBERT GOTTSCHALK
Attesting Officer               Commissioner of Patents